US006486432B1

United States Patent
Colby et al.

(10) Patent No.: US 6,486,432 B1
(45) Date of Patent: Nov. 26, 2002

(54) METHOD AND LASER CLADDING OF PLASTICATING BARRELS

(75) Inventors: Paul N. Colby, New Castle, PA (US); Joeo M. Gatti, Strongsville, OH (US); Shawn P. Bodnar, New Waterford, OH (US); Paul T. Colby, New Castle, PA (US)

(73) Assignee: Spirex, Youngstown, OH (US)

( * ) Notice: Subject to any disclaimer, the term of this patent is extended or adjusted under 35 U.S.C. 154(b) by 0 days.

(21) Appl. No.: 09/448,329

(22) Filed: Nov. 23, 1999

(51) Int. Cl.[7] ............................................. B23K 26/00
(52) U.S. Cl. ........................... 219/121.63; 219/121.64; 219/121.85
(58) Field of Search .................. 219/121.63, 121.64, 219/121.81, 121.79, 121.85, 121.78

(56) References Cited

U.S. PATENT DOCUMENTS

| | | | |
|---|---|---|---|
| 4,590,033 A | | 5/1986 | Chapet .......................... 419/9 |
| 4,665,294 A | * | 5/1987 | Hira et al. ............. 219/121 LD |
| 4,694,136 A | | 9/1987 | Kasner et al. .............. 219/121 |
| 4,803,334 A | | 2/1989 | Burke et al. ........... 219/121.64 |
| 5,066,846 A | | 11/1991 | Pirl ........................ 219/121.63 |
| 5,182,429 A | | 1/1993 | Pirl et al. ............... 219/121.82 |
| 5,196,272 A | | 3/1993 | Morishige et al. .......... 428/655 |
| 5,359,172 A | | 10/1994 | Kozak et al. ........... 219/121.65 |
| 5,371,767 A | | 12/1994 | Pirl ............................ 376/260 |
| 5,387,292 A | | 2/1995 | Morishige et al. .......... 148/276 |
| 5,426,278 A | | 6/1995 | Hirano et al. .......... 219/121.63 |
| 5,491,317 A | | 2/1996 | Pirl ........................ 219/121.64 |
| 5,496,422 A | * | 3/1996 | Morishige et al. .......... 148/525 |
| 5,653,897 A | * | 8/1997 | Findlan et al. .......... 219/121.63 |
| 5,656,185 A | * | 8/1997 | Findlan et al. .......... 219/121.64 |
| 5,667,706 A | | 9/1997 | Pirl et al. ............... 219/121.64 |
| 5,728,992 A | | 3/1998 | Swudwa ................ 219/121.64 |
| 5,994,664 A | * | 11/1999 | Anderton et al. ...... 219/121.64 |
| 5,997,513 A | | 12/1999 | Findlan ................. 219/121.64 |

FOREIGN PATENT DOCUMENTS

| | | |
|---|---|---|
| DE | 37 34 328 C | 11/1988 |
| DE | 37 40 916 A | 6/1989 |
| DE | 42 26 768 A | 2/1994 |

OTHER PUBLICATIONS

Patent Abstracts of Japan, Apr. 21, 1989, Paul Star Kagyo KK.
IHI's Material Processing Technology For IN SI–TU Repair by Nuclear & Chemical Component Works.
Laser Cladding Technology in IHI/Jun. 1996.
Development of Laser Surface Cladding with Energy Transmission in Optical Fiber by IHI Engineering Review vol. 24 No.1.
Developing of Laser Surface Cladding With Energy Transmission THrough Optical Fiber / Sep. 1994.
Plasticating Components Technology by Spirex.
*The Journal of Medals* "High–Power Laser Beam Cladding" Feb. 1987.

* cited by examiner

*Primary Examiner*—M. Alexandra Elve
(74) *Attorney, Agent, or Firm*—Robert G. Lev

(57) ABSTRACT

A system and process is provided for cladding the interior of plasticating barrels or any other interior surface. The cladding operation uses a laser head that carries out a spiral welding operation to create a smoother lining than is capable with conventional welding techniques. A number of different techniques can be used, including the use of feeding laser energy at one end of a tube to be reflected from laser aiming optics inserted through a second end of the tube. Unidirectional welding can be used to facilitate gravity as a smoothing agent. In another embodiment omnidirectional welding can be carried out using a shaped mirror and a donut-shaped laser pattern. The cladding operation can be simplified by baking a coating of the welding matrix and anti-abrasive material onto the interior of the surface to be clad prior to the welding operation.

16 Claims, 3 Drawing Sheets

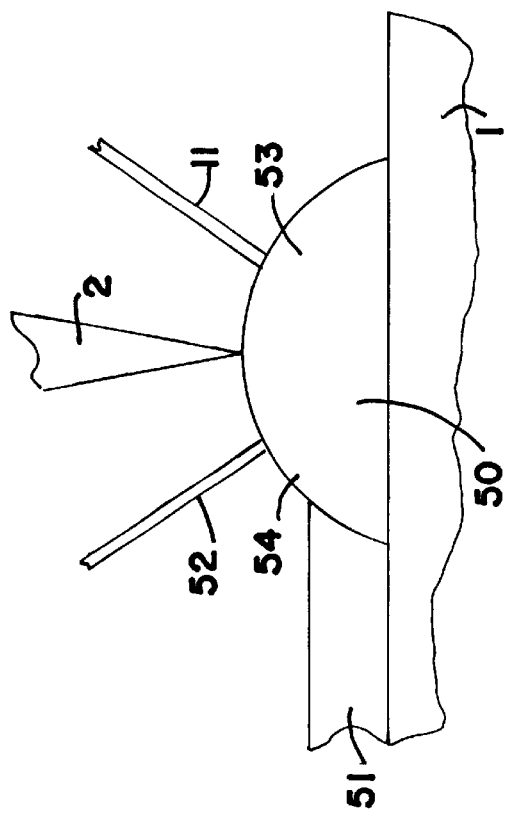
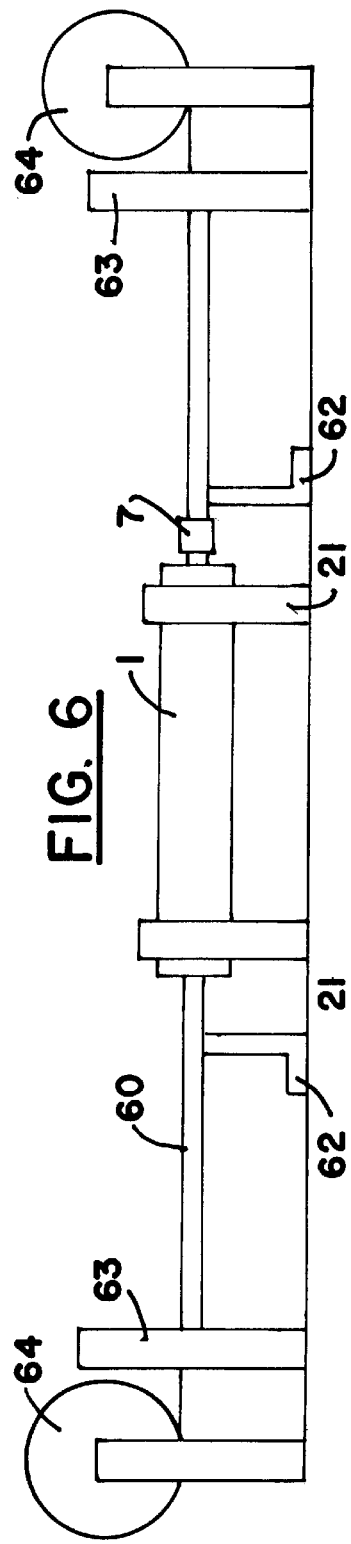
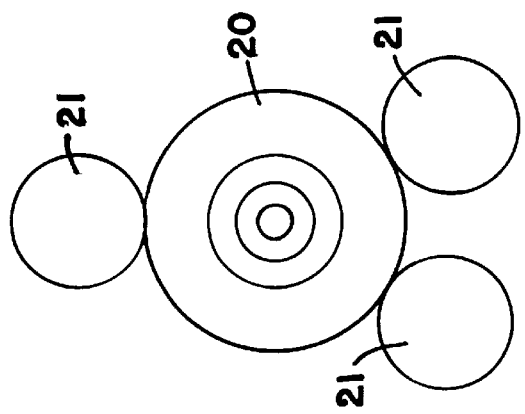

METHOD AND LASER CLADDING OF PLASTICATING BARRELS

TECHNICAL FIELD

The present invention relates generally to the field of plasticating components, such as screws and barrels, used for extruding plastic. In particular, the present invention is directed to a structure for a more abrasion-resistant and corrosion-resistant plasticating barrel, and a technique for manufacturing the lining of the improved barrel.

BACKGROUND ART

Extruders and tubers (rubber extruders) have been in use at least since the beginning of the twentieth century. With the advent of plastics, the demand for such extruders has become greater and the processing conditions have become more severe. Originally such devices were essentially a simple screw rotating inside a single-material barrel without a lining. This is no longer the case due to the newer and more difficult to process materials.

Both of these components are subject to wear from metal-to-metal contact, and from abrasive and corrosive fillers in the plastic or rubber compounds. The original barrels had an internal surface that was nitrided to give improved abrasive wear resistance. In the later 1950's bimetallic barrels were developed using a centrifugal casting process, as briefly described in the Spirex publication, entitled *Plasticating Components Technology*, 1997, incorporated herein by reference. Also, such improved barrels were adapted for use with injection molding machines, in addition to conventional extruders.

Centrifugal casting of plasticating barrels is a process used to line the internal surface of a barrel with an abrasion and/or corrosion resistant liner that is different from the barrel backing material or substrate. The process involves installing a lining material, such as a powder, inside the heavy-walled barrel cylinder at room temperature. The ends of the barrel are capped (usually welded) and the barrel and unmelted powder are placed in a casting oven. The barrel is then rotated and heated until the liner material metals are melted uniformly distributed on the internal surface of the barrel. Early liner materials were iron/boron materials that created some metal carbides and were very much more wear resistant that the nitrided barrels. In 1968 improved liners became more abrasion resistant by the addition of very small, discrete metal carbides particles like tungsten carbide and equivalent materials.

Most rotational casting ovens are gas heated but some are induction heated. In either case, the inside of the barrel must be heated to a point where the liner powder melts, but the thick-walled barrel material or substrate does not melt. After melting is accomplished the barrel is slowly cooled so that stresses are not induced, and so that the liner material does not crack. After cooling, the barrel is honed, straightened and machined to it's final dimensions. Often this requires installation of a high-pressure sleeve at the discharge end of the barrel.

There are a number of disadvantages to this technique. The gas fired or induction furnaces with rotating equipment are very expensive, and require extensive maintenance. This includes periodic and prolonged shutdowns to reline the refractory surfaces of the oven. Further, even when the furnaces are functioning properly, set up for the coating of each barrel is an awkward and time, consuming process.

Also, the process of centrifugal coating requires that the liner material or material matrix melt at a lower temperature than the backing or substrate material. This creates severe limitations on the liner materials than can be used. As a result, abrasion-resistant and corrosion-resistant materials are limited to formulas that melt at a lower temperature than the barrel substrate. In many cases the optimum barrel substrate and under materials cannot be used for the materials to be handled.

There is also the requirement of raising the backing or substrate material to a temperature close to the melting point of the substrate material followed by a slow cooling to anneal the backing material. This lowers the strength of the annealed backing material. Unfortunately, very high strengths are now required because such barrels can be subject to internal pressures of 40,000 psi or higher, and temperatures up to 700 deg. F. These conditions require the installation of a high pressure sleeve at considerable expense. Some newer, higher priced alloys can reduce this effect somewhat by reducing the loss of strength. However, greater expense is incurred.

During the rotational casting process the heavier metal carbide particles tend to be thrown outward by centrifugal force. This moves these particles away from the inside surface where they are needed for abrasion resistance. As a result, the resulting lining is far more susceptible to wear caused by abrasion than if the metal carbide particles are properly located on the inner surface of the lining or evenly distributed throughout the lining or cladding.

The high barrel temperatures that are reached during casting make it difficult to maintain the straightness which is critical to the plastic processing operation. Straightening of the barrel cannot be done by conventional straightening presses because reverse bending cracks the relatively brittle liner. The rotational casting process requires a long time to heat up the liner and barrel substrate. Additional time is required for slow cooling after the lining operation. This causes added expense in labor and electrical costs.

Because the lining process can only be successful in a very narrow range of time and temperatures, often the results are not satisfactory. High temperatures and long time periods spent at these temperatures cause dilution by migration of the substrate material into the barrel lining material. This causes poor hardness and poor abrasion resistance. Also substrate migration of the base iron material can cause poor corrosion resistance in certain applications. Extended periods at high temperatures also cause the metal carbide particles coating the liner inner surface to melt into solution in the matrix matter (constituting the liner) rendering them useless.

When temperatures are too low and the time periods at properly elevated temperatures are too short, an inadequate metallic bond can result. Such an inadequate metallic bond means that the liner may become separated from the barrel substrate or backing material. This condition could render the entire barrel useless. Further, in some cases portions of the liner may come dislodged, corrupting the molten plastic and/or fouling the screw pushing the molten plastic through the barrel. In either case, the barrel is subject to catastrophic failure, and the plastic processed therein ruined.

A totally different method to produce barrel liners is constituted by laser welding or cladding. Laser cladding is laser welding of a different surface onto a base or substrate metal. This new process diminishes or eliminates all of the disadvantages listed above.

The more conventional MIG or TIG welding of the inside diameter (ID) of barrels can be done, but it is more difficult to get into smaller diameter barrels. The zone affected by heat is much greater, and the welded surface is poorer, causing much greater expense in finishing compared to the "near-net shape" of laser-welding.

Laser welding of the ID of barrels involves the depositing of the liner material prior to welding in the form of paste or a separate liner tube, or during welding with a powder or continuous wire. The laser welder usually includes a laser beam delivered from a remote source via fiber optics and optical systems, or by direct laser beams.

This technique has a number of advantages. For example, devices have been made that will allow laser welding into diameters as small as ¾ inch. Laser cladding also has a very shallow heat-affected depth which gives much less dilution of the liner material into the barrel substrate. This technique also creates much less stress in the substrate, reducing the tendency to bend or warp.

Laser cladding is a relatively robust process that allows a wide latitude of materials to be used, including materials that melt at higher temperatures than the barrel substrate. This can lead to improved matrix materials and improved ceramic or carbide materials as anti-abrasive coatings on the liner. Discrete abrasion resistant carbide or ceramic particles do not migrate toward the substrate as in rotational casting. This leaves them evenly distributed where they are needed.

The substrate does not necessarily need to be preheated prior to welding, thus reducing production time and expense. Heat imparted by the laser welding process is much reduced and can be removed during welding by internal and external methods. This means that a long cooling down time can be eliminated. As a result, the process is less time-consuming than centrifugal casting.

Laser welding is an actual welding process with a metallurgical bond rather than a brazing process where the liner melts at a lower temperature than the substrate as in rotational casting. The laser cladding equipment is generally lower cost than gas-fired or induction furnaces.

Several devices to laser clad the inside of pipes have been invented and commercialized. These include EPRI Patent Nos. 5,653,897 and 5,656,185 and IHI Patent No. 5,426,278. Also included are U.S. Pat. Nos. 5,496,422; 5,196,272; and, 5,387,292. All of the aforementioned patents are incorporated herein by reference to facilitate a better understanding of the present invention. These devices are designed to repair damaged or corroded heat exchanger tubes in power generation plants. These systems are designed to make short, localized repairs in relatively long, fixed pipes that cannot rotate. Consequently, each of these systems uses a rotating laser head for welding. The systems described in the aforementioned patents include the insertion of a cladding or inlay material by wire, powder, paste, and thin wall tube. The paste and the tubes are already in place before laser cladding. In the case of the EPRI patent, a coiled wire is placed inside the pipe directly above the repair area in order to have it easily accessible and easy to feed as the cladding proceeds. This method is limited to short longitudinal lengths of welds as is generally required in boiler repair. Powder is difficult to introduce in the horizontal position because, without gravity assist, it tends to clog and interrupts cladding. Drawings of these various welding devices are shown in the patents.

For prolonged or full length cladding of 20:1 L/D or longer pipes the head and especially the reflecting mirrors must be cooled. This can be done by a cooling fluid such as air or water. The EPRI patent does not have such cooling except for the bearings that are required to rotate the head inside the pipe. The IHI device allows cooling (by air) coming from the direction of the laser source.

All of these devices must have all auxiliary services introduced from the laser head end of the tube because access from the opposite end is not available, and cannot be coordinated with the activity provided from the laser end. These auxiliary services can include fiber optical viewer, wire/powder feeds, cooling media, optics (lenses) and focusing devices.

The devices disclosed in the subject patents weld on constantly changing surfaces. This tends to give a non-uniform and less smooth surface due to the influence of gravity. If the cladding is done with the pipe vertical, the melt pool tends to not be flattened and can have exaggerated rings or other distortions in the surface. In any case, there is no natural tendency to flatten and smooth the surface in a uniform manner.

Also materials currently used in conventional laser welding processes are used primarily for corrosion resistance. This limited application of the conventional technology is adequate since the boiler tubes (in which conventional laser welding occurs) are not exposed to the abrasion of the types of materials handled by plasticating barrels.

There is also a need to make such devices smaller than the standard commercial sizes now available. In particular, barrel I.D.'s as small as 14 mm (0.551 inch) are used for plasticating barrels. Thus, appropriate welding devices are necessary to clad or line the interior of the plasticating barrels. Conventional rotating welding devices operate entirely from one end of the tube being lined or welded. Consequently, size reduction for such welding devices is severely limited. This is particularly true since the welding head must include all auxiliary services, as well as the bearings. This entire structure is fed into the tube to be welded from only one side of the tube. As a result, size reduction of the overall welding apparatus is very problematical, and cannot accommodate some smaller sizes used for plasticating barrels.

Accordingly, there is a need for a system capable of addressing the smaller sizes of plasticating barrels, and to provide smooth, uniform inner linings to such plasticating barrels. Of necessity, such a system will have to be flexible, and capable of using a number of different techniques to produce an optimum product at reasonable costs.

SUMMARY OF THE INVENTION

It is one object of the present invention to provide a system for lining tubes or any interior surface that overcomes the drawbacks of the conventional art.

It is another object of the present invention to provide a system for inside diameters (I.D.) that is sufficiently flexible so that a wide variety of tube sizes and cladding materials can be accommodated.

It is a further object of the present invention to provide a system for lining inside diameters of tubes capable of accommodating smaller I.D. sizes than is currently possible with conventional techniques and systems.

It is an additional object of the present invention to provide a system for lining inside diameters of tubes in which a more uniform lining can be achieved than is possible with existing welding techniques.

It is again a further object of the present invention to provide a system for lining of I.D.'s in which a smoothing agent operates in a uniform manner on each of the welds constituting the cladding of the plasticating barrel.

It is still another object of the present invention to provide a system for laser-cladding the interior of a metal tube wherein the system is relatively simple to set up compared to conventional systems.

It is again a further object of the present invention to provide a process for laser-cladding the interior of a metal tube, requiring reduced operating time.

It is still another object of the present invention to provide a system for quickly and easily repairing the lining of metal tubes at lower expenditures than those incurred with conventional systems.

It is again a further object of the present invention to provide a system for lining the interior of the metal tube by laser-welding wherein the conventional necessity of a rotating laser head is avoided.

It is yet another object of the present invention to provide a system for lining a metal tube using laser welding in which movement of the welding head is required only along the axis of the tube being welded.

It is again a further object of the present invention to line a metal tube using laser welding to which an anti-abrasive material is added so that the anti-abrasive material remains uniformly distributed in the laser-welded cladding.

It is yet another object of the present invention to provide a smoother, pre-machined weld that is obtainable from conventional welding techniques, in particular, MIG and TIG methods.

It is yet another object of the present invention to provide a method of uniformly precoating an accurate amount of material on an interior surface to facilitate welding operations thereon.

It is still a further object of the present invention to provide a system of precisely placing a uniform pattern of anti-abrasive material in a weld melt without melting or otherwise degrading the anti-abrasive material.

It is yet another object of the present invention to facilitate faster, pre-weld set up of plasticating barrels.

These and other goals and objects of the present invention are achieved by a plasticating barrel adapted for use with extruded molten plastic. The barrel includes a substrate composed of a first metallic material and a liner composed of a second metallic material. The liner is fabricated by laser welding to achieve a substantially uniform cladding over the entire diameter of the barrel. The liner is formed to have an inside diameter of less than 15 mm as finished by laser welding.

In another embodiment of the present invention, a plasticating barrel is adapted for use in extruding molten plastic, and includes a substrate of a first metallic material and a liner of a second metallic material. The liner is formed by laser welding of the second metallic matrix material to clad the interior of the barrel. An anti-abrasive layer is formed of a third material composition and is uniformly arranged in unmelted form throughout the metallic matrix.

Another embodiment is constituted by a system for laser-welding a lining to the interior of a metal tube. The system includes a laser welding head arranged to enter the metal tube from a first end of the metal tube. The system also includes auxiliary equipment arranged to enter the metal tube from the second end of that metal tube.

In yet an additional embodiment of the present invention, a system for lining a metal tube by laser-weld cladding is provided to include a laser aiming optic head. Also included is a device for holding the metal tube in a horizontal position and rotating the tube about a horizontal axis. Another device is used to position the laser aiming optic head so that welding always takes place in a single direction. A controller coordinates the rotational movement of the metal tube and the operation of the laser aiming optic head.

It is still a further embodiment of the present invention a system is provided for lining an interior surface. The system includes a laser aiming optics head and a mechanism for welding/cladding on the bottom surfaces thereby applying gravity to create a series of smooth uniform welds that constitute the lining of the metal tube.

Yet another embodiment of the present invention includes a system for lining a metal tube by laser-welding. The system includes a laser source arranged to emit laser light into a first end of the metal tube. The system also includes a laser aiming optics head arranged to deflect light from the laser source, and arranged to enter the metal tube at a second end.

Yet an additional aspect of the present invention includes a system for lining a metal tube by laser welding. The system includes a laser aiming optics head arranged to deflect laser light entering the metal tube at the first end of the metal tube. The laser aiming optics head is rotateably mounted an arranged to enter the metal tube at a second end of the metal tube.

Another aspect of the present invention is manifested by a method of lining a metal tube by laser welding. The process includes the step of arranging the metal tube in a horizontal position. Next a laser aiming optics head is placed in the metal tube. Then a series of laser welds are carried out in a single direction while rotating the metal tube and moving the laser aiming optics head in a single direction along the metal tube.

Again another aspect of the present invention is a method of lining a metal tube by laser-welding, where the method includes the steps of placing a laser aiming optics head in the metal tube at a first end of that tube. Then, laser light is transmitted from a second end of the metal tube to be deflected by the laser aiming optics head to effect laser welding in the metal tube.

Yet an additional aspect of the present invention is a method of cladding an interior surface by laser welding. The method includes the first step of arranging a laser aiming optics head to operate in a predetermined pattern along the interior surface to create a series of weld melts. Each of the weld melts has a warmer heating portion and a cooler trailing portion. Then, an anti-abrasive material is added to the trailing portion of each of the weld melts. As a result the anti-abrasive material is undegraded and uniformly distributed through each of the weld melts.

An additional aspect of the present invention is manifested by a plasticating barrel adapted for use of extruding molten plastic. The barrel is of a first metallic material, and is provided with a laser clad lining of a second metallic material. The second material is a mixture of nickel and chromium.

Still an additional aspect of the present invention is a method of lining a tube including a first step of inserting a slurry into the tube. A slurry includes liner material. Then the tube is centrifugally cast to form a uniform hard coating of the slurry to adhere to the inside diameter of the tube. Then laser welding is carried out on the coating to form the finished metallic lining.

BRIEF DESCRIPTION OF THE DRAWINGS

FIG. 4(b) is an end view diagram depicting the embodiment of FIG. 4(a).

FIG. 5 is a schematic diagram depicting the weld-melt and relative locations of material fed to the weld melt.

FIG. 6 is a side view schematic diagram depicting a support system for tube to be lined and the support for the welding equipment to be used to clad the interior of the two.

DETAILED DESCRIPTION OF THE PREFERRED EMBODIMENTS

Figure 1:
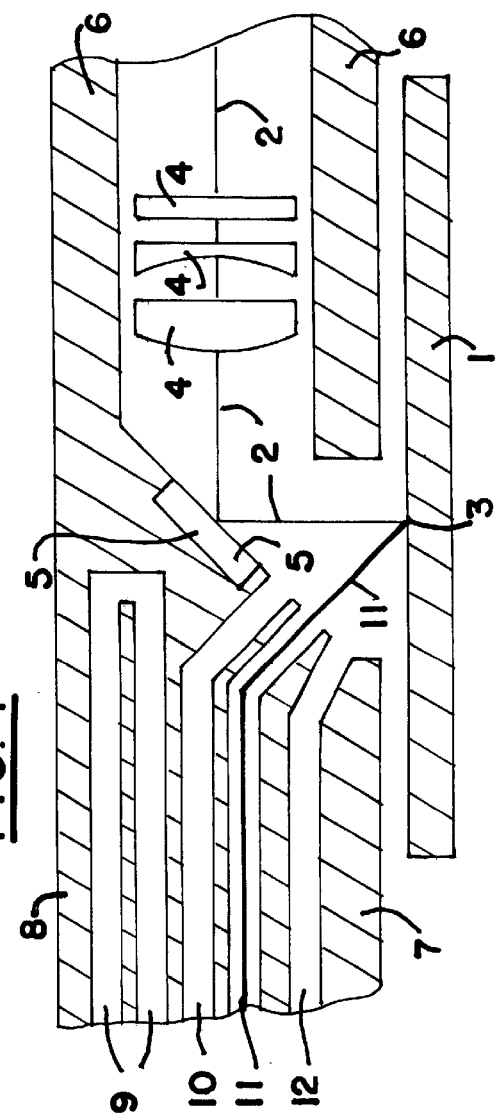
FIG. 1 is a schematic diagram depicting the various elements in a laser-weld head and auxiliary system for one embodiment of the present invention.

The first embodiment of the present invention is depicted in FIG. 1. Welding head 7 includes two major components as depicted in this figure, laser aiming optics 4 welding head, and an auxiliary system. These are mounted in housings 6 and 7, respectively. Both housings are placed within a metal tube or barrel 1, in which a lining is to be fabricated by laser-welded cladding. For the sake of simplicity, the other wall of tube 1 is not shown in FIG. 1.

The laser aiming optics 4 of the laser welding head 7 are used to direct laser beam 2 to a point 3 at which a weld is to be placed to form the lining in tube 1. The aiming optics 4 includes a lens system and a reflecting mirror 5. The aiming optics are contained within a support structure 6, and can either be attached to the auxiliary system or separated therefrom. For example, the auxiliary system can be separated from the laser aiming optics housing 6 and placed in a separate housing 8. Different configurations for separating the two housings and their components can be used within the scope of the present invention.

The auxiliary system is mounted in its own housing or support structure 8, and includes a variety of different elements. Examples of such elements are cooling device 9, a gas supply conduit 10; and, a feeding mechanism 11, which serves to provide cladding material to the weld point 3. An optical system 12 can be added so that the characteristics of the welds and the progress of the welding process can be properly monitored.

Both the auxiliary system housing 8 and the laser aiming optics housing 6 can be supported by bearings (not shown) that serve as an interface between the housings 6,8 and the metal tube 1. A variety of different support mechanisms are available and are generally well known in the conventional art.

One advantage of separating the housing 8 for the auxiliary system from the housing 6 for the laser aiming optics is that these two components can be inserted into metal tube 1 from opposite ends of the tube. The advantage of this is that the two components and three housings can be made much smaller than conventional systems, accommodating much smaller inner diameters for the metal tubes, such as plasticating barrels. In particular, the smallest tube sizes that can be accommodated by existing conventional systems is approximately 19 mm for the inner diameter of the tube, after it has been lined. The present invention can accommodate inner diameter as small as, or even less than 14 mm.

Figure 2B:
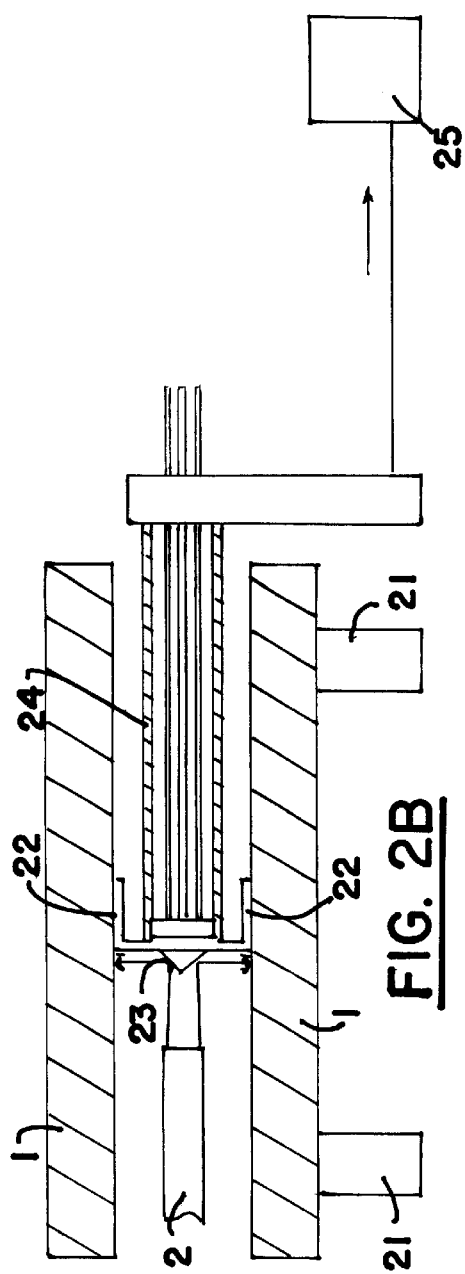
FIG. 2(b) is an end view of the diagram of FIG. 2(a).
Figure 2A:
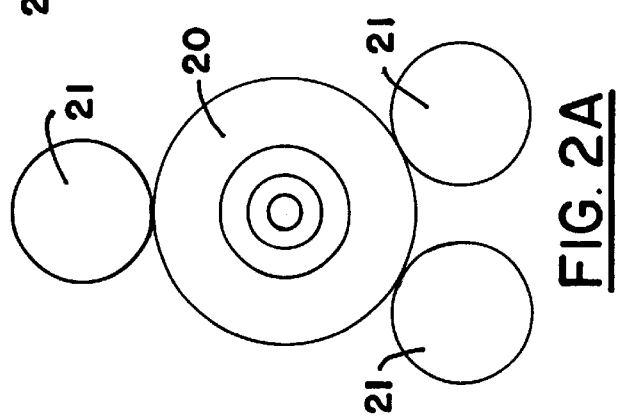
FIG. 2(a) is a schematic diagram depicting a second embodiment of the present invention.
Figure 4A:
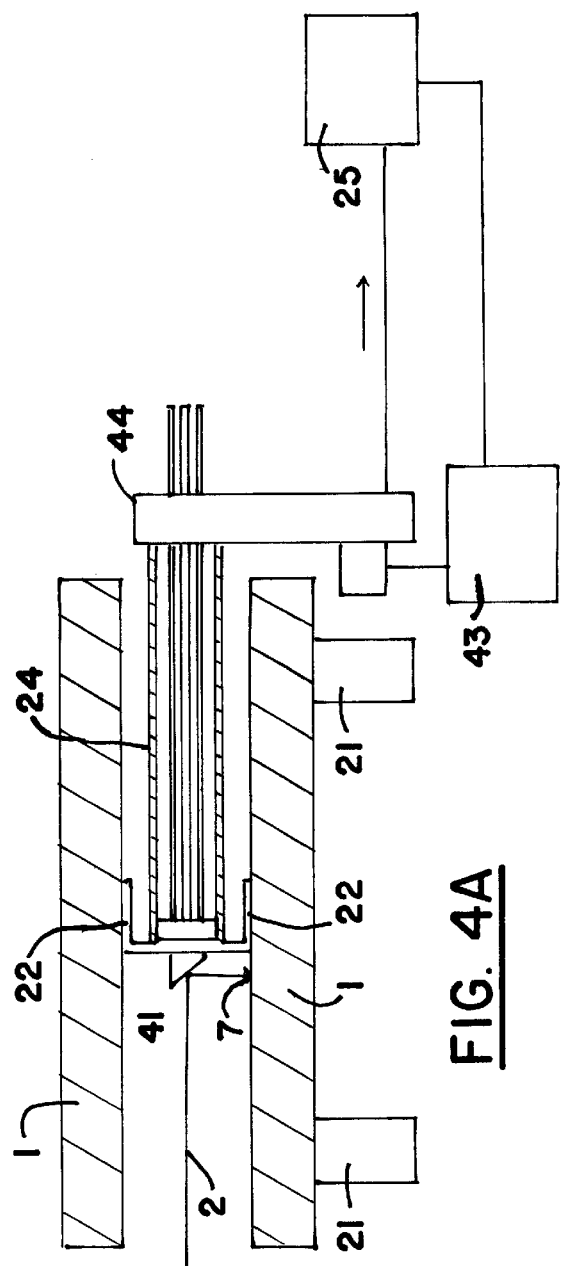
FIG. 4(a) is a schematic diagram of the present invention.

The use of two separate structures for the auxiliary system and the laser aiming optics also produces a much higher level of flexibility than is found with conventional systems. As a result, a wide variety of configurations, as depicted in FIGS. 2(a) and 4(a) are possible. However, the present invention is not limited to the embodiments depicted in these two Figures but admits to many other variations and equivalents that would occur to one skilled in this technology, once having been taught the present invention.

An additional advantage with the separate reduced size structures containing the auxiliary system and the laser aiming optics 4,8, is that additional auxiliary devices can be added to either the auxiliary system housing 8 or the laser aiming optics housing 6. One example is an additional material feed (not shown) that can be used to add anti-abrasive materials, such as metal carbides, to the molten weld material or matrix. Such materials can sink deep into the molten weld matrix lessening the value of the anti-abrasive particles. However, with the flexibility provided by the present invention, anti-abrasive material can be fed to the weld melt so that the anti-abrasive material is added to a particular part of the molten weld matrix. As a result the anti-abrasive particles will maintain their integrity, and operate efficiently.

As defined in FIG. 5, the laser weld melt 50 will have a forward melting portion 53 which is at a higher temperature than a trailing portion 54. The anti-abrasive material 52 is added to the cooler trailing portion 54 of the molten weld material 50 so that the anti-abrasive material tends not to go into solution with the matrix material 11. Since the anti-abrasive materials 52 are added on the trailing side 54 of the weld melt 50, these materials are not degraded by the laser beam 2. Consequently, there is no tendency for them to melt into the solution with the weld puddle. Rather, the anti-abrasive particles 52 maintain their original integrity so that they can be distributed even throughout the weld puddle 50. As such, the anti-abrasive material functions far more efficiently than with conventional systems.

Because the two housings, 6 and 8, respectively, are being fed from different ends of tube 1, additional devices (such as the feeder for anti-abrasion materials) are easily within the capability of the present invention while still maintaining the capability of lining tubes or even irregular surfaces less than 15 mm of inner diameter.

FIG. 1 depicts the preferred positioning of the laser aiming optics 4,5 for welding in another preferred embodiment of the present invention. The weld point 3 is always at the same position with respect to horizontal and vertical orientation of tube 1. For this to occur, the laser 2 is always aimed at the same position, and the tube 1 is rotated. Tube 1 can be rotated about a horizontal axis 20 by rollers 21, as depicted in FIGS. 2(b) and 4(b). However, other handling mechanisms can be used to rotate tube 1. A controller (not shown) is used to coordinate the rotational movement of tube 1 and the operation of laser beam 2 to effect the lase-weld cladding that will constitute the liner of tube 1. Such controllers are already well-known in the conventional technology and need no further elaboration for purposes of explaining the present invention.

The laser-weld cladding generated at point 3 and constituting the finished liner (shown as 51 in FIG. 5) of tube 1 is especially smooth due to another characteristic of the present invention. Since weld 3 always occurs at the lowest point of a horizontally level tube 1, gravity serves to smooth each weld, making each weld, and the resulting liner 51, far smoother than is found with conventional techniques. In particular, the finishes achieved with the present invention before machining the final product, has smoothness variations of between 0.010 and 0.005 inches. Further, the present invention is capable of achieving even smaller smoothness variations.

The normal operation of the present invention is the creation of the welded cladding (51 in FIG. 5) in a spiral or helical configuration. This spiral configuration is created by the rotation of tube 1 and the movement of the tube along a horizontal axis by the laser aiming optics 4. The coordination of these two movements is also coordinated by the controller (not shown). The programming of the controller to effect the spiral shaped weld pattern that ultimately constitutes the liner of tube 1 can be provided by standard programming techniques, and needs no further elaboration for purposes of understanding the present invention.

In the alternative, the laser aiming optics housing 6 and the auxiliary equipment housing 8 can be mounted on sled 22 and moved through the tube 1 using linear motion system 25 as depicted in FIGS. 2(a) and 4(a). The operation of the linear motion system 25 to coordinate with the welding operation requires no special expertise beyond skill already available in this technology. If the laser aiming optics housing 6 is not connected to auxiliary system housing 8, an additional linear motion system will be necessary to move the auxiliary system housing 8 in coordination with the movement of the laser aiming optics housing 6. This would incur additional complexity and expense.

This drawback can be remedied by the arrangement of FIG. 4(a), in which the auxiliary system is contained within utility extension tube 24, and is connected to the lens system and constituted by rotating mirror 41. The laser beam 2 is fed from the opposite end of tube 1 from laser aiming optics 41 and the auxiliary system. In the embodiment of FIG. 4(a) the rotating mirror 41 and the auxiliary systems are supported within tube 1 by sled 22. In this embodiment, the advantages of the present invention are retained since the laser beam 2 is entering tube 1 at the opposite end from the rotating mirror 41 and auxiliary systems in the tube. A rotation system 45 for the tube 24 is necessary, adding additional complexity and expense not found in other embodiments of the present invention. Further, coordination between the linear motion of the system (as controlled by controller 25) and the rotation of the tube 24 (as controlled by controller 43) adds still an additional level of complexity to the present invention.

This is justified by the preferred use of this particular embodiment, spot welding of the tube 1 interior for repair purposes. By carrying out such a process, it will not be necessary to go through the expense of relining an old or worn tube 1. Rather, the worn areas could be filled with cladding and smoothed to the existing lining. Thereby, the expense of the additional controllers, such as linear motion/tube rotation interface 43, would be justified. Accordingly, the expense of creating an entirely new lining and/or re-machining an entire lining would be avoided for the laser-clad and conventional liners by the FIG. 4(a) embodiment of the present invention.

FIG. 2(a) depicts another embodiment of the present invention. As with the embodiment of FIG. 4(a), the present embodiment uses both ends of tube 1 to deploy the laser welding system. However, a greater degree of simplicity is achieved through the use of conical mirror 23 which deflects laser beam 2 into multiple directions. With this embodiment, rotation of either tube 1 or utility extension tube 24 (attached to the conical mirror 23) may still be necessary to carry out the welding on the entire interior of tube 1.

Figure 3B:
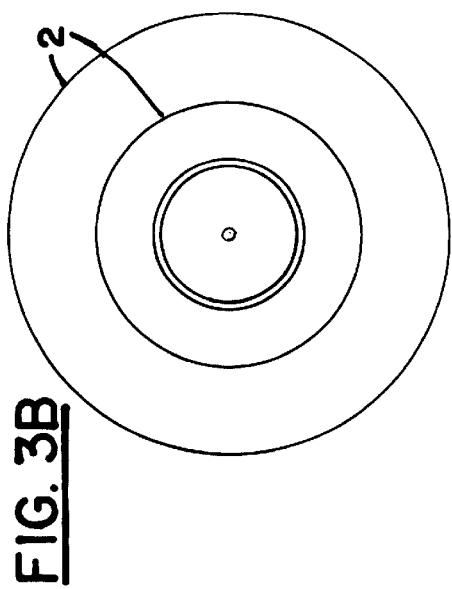
FIG. 3(b) is a side view diagram depicting the weld area resulting from movement of the conical mirror of FIG. 3(a).
Figure 3A:
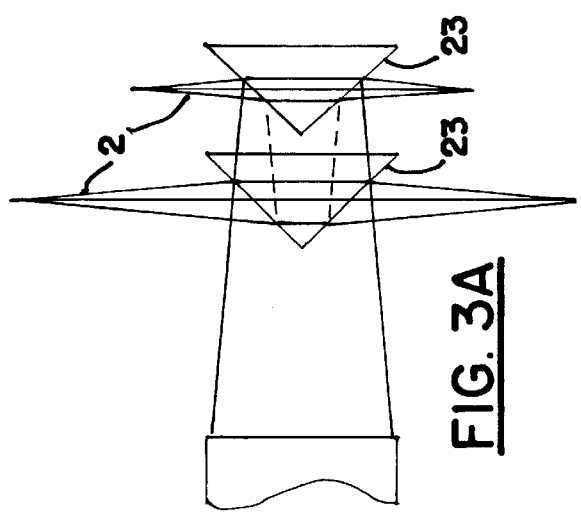
FIG. 3(a) is a schematic depicting a variation of the embodiment depicted in FIG. 2(a).

Greater coverage of the weld area, and thus, a faster welding process can be obtained by the FIG. 2(a) embodiment. This embodiment uses a conical mirror 23 as depicted in FIG. 3(a). The conical mirror is arranged to direct laser light uniformly to a predetermined area of the interior of tube (1). The conical mirror is adjustable so that the shape and location of weld site 3 can be easily varied by moving the mirror or adjusting the size and shape of the mirror. This variation in the weld area is depicted in FIG. 3(b). However, the size and shape of the weld area are not limited to that depicted in FIG. 3(b).

Rather, any number or variety of mirror sizes and shapes can be used to direct the laser beam 2 to a specific point on the interior of tube 1 (or any other shape of interior surface), and the adjustability of both mirror size and shape easily facilitates converting the welding system from one tube size to another. Further, while the laser beam 2 is donut-shaped in the example of FIG. 3(a), the laser beam can be configured in any manner deemed appropriate for the desired weld configuration. Accordingly, any size or shape of the mirror can also be used to facilitate a desired weld pattern, or other laser-weld characteristics.

Of particular interest is a mirror configuration (not shown) that directs the weld site 3 to be either well-forward of the mirror, or well-behind the mirror. Such an arrangement is effective to keep the weld site 3 away from the mirror, thereby avoiding damage to the mirror from the heat of the welding or any byproducts of the welding.

The use of the adjustable conical mirror is depicted in the example of FIG. 3(a) facilitates multi-directional welding of the inner diameter of tube 1. This arrangement can also facilitate omnidirectional welding as well. This permits a much faster laser-welding operation. This embodiment, like the other embodiments of the present invention, also provides a smoother, more uniform, "near net shape" surface resulting from the welding process. As a result, after-welding machining operations are much reduced, thereby reducing the costs and the time expenditure of the overall lining operation.

Any shaped mirror arrangement is easily mounted on the auxiliary tube 23 depicted in FIG. 2(a). The relationship between the mirror (conical mirror 23, as depicted in FIG. 2(a) and the auxiliary tube 23, which contains all of the auxiliary equipment previously discussed, can be arranged to facilitate a particular weld site (or series of weld sites) with respect to the position of the mirror. Accordingly, an additional aspect of the present invention, increased flexibility over that of conventional systems, is achieved.

While there are many advantages provided by the foregoing embodiments of the present invention, there are still other improvements that can be made. For example, delivering a wire to the weld site is often problematic, especially when the wire travels more than a few feet. When the wire contains hard materials, the wire is stiff and proned to kink or break during feeding. One method of addressing this problem is to use special liners to reduce the friction of the wire along the feed path. However, when the wire breaks, hard materials of the wire contaminate the liner, causing additional problems. Another solution is to use two separate wire feeders, one at the wire roll and the other near the welding head, or auxiliary head. Unfortunately, it is often very difficult to fit a wire feed into a small plasticating barrel. As a result, the use of wire feeds (both for the matrix material and the anti-abrasive material) may limit the advantages of the present invention with regard to the tube sizes that can be lined.

One solution is to deliver the powder at an angle such that gravity may assist the delivery of the powder over long distances. The metal tube can be placed on an incline for welding so that the powder will feed reliably. However, there are certain problems inherent to this approach. Often, the manufacturing facility must be modified with greater ceiling height to accommodate the added height of the inclined welding machine. This arrangement also increases the cost of the welding machine. Further, the operator would have greater difficulty observing and manipulating the weld piece to be welded. Also, by inclining the tube to be realigned, some of the advantages of the previously-described embodiments of the present invention are lost.

The instant embodiment of the present invention overcomes these difficulties through the provision of a thick, even coating of material to the interior of the metal tube or other interior surface to be lined. The coating can be applied to many different shapes and sizes, and includes everything needed for the laser-welding process described with respect to the present invention. Accordingly, the coating contains both matrix material and the hard, anti-abrasive material required for the finish lining of a plasticating barrel.

The coating of the present invention includes a matrix material, such as a nickel-chrome alloy which serves as a metallic binder for the overall weld. The hard anti-abrasive material is also part of the coating, and is mixed as a powder with the matrix material to form a paste which is used to coat the interior of the metal tube. A key aspect of the instant embodiment of the present invention is the use of titanium diboride ($TiB_2$). It has been discovered that this material is more wear-resistant as a facing material than carbides mixed in the same nickel-chrome alloy metallic binder.

However, other materials will work equally well within the context of the present invention. Examples of such materials are a family of ceramics known as "titanium ceramics". These include titanium diboride (as is used in one preferred embodiment); titanium dioxide; and, titanium carbide. Partially stabilized zirconia is also used, and can include zirconium carbide; and, zirconium diboride. Any equivalent materials can be used as well, including diamonds, synthetic diamonds or any equivalent thereof. Any of these anti-abrasive materials may or may not be metal coated for use with the present invention. The use of a metal coating, in a welding process is used to reduce the possibility of melting the core anti-abrasive material.

Both the nickel-chrome alloy matrix material and the titanium diboride anti-abrasive material are mixed together in powder form for the welding process that will line the metal tube. Under these conditions, the melting point of the nickel-chrome alloy is 1,950° F. On the other hand, the melting point of titanium diboride is 3,000° F. The welding process can be controlled in such a way as to melt the nickel-chrome alloy, forming a bond with the substrate material, while not melting the titanium diboride material. As a result, the titanium diboride material remains undissolved and evenly distributed throughout the weld melt where they would be most effective. Because the two materials are combined as a powder, it is possible to even distribute the titanium diboride throughout the nickel-chrome alloy matrix material.

The fine powder mixture of the present invention includes a second binder material that is used to adhere the powders in position on the interior of the metallic tube to be clad. The second binder is composed of two materials. The first is one of many materials commonly used to glue flux to welding stick rods. The optimum material used with the present invention is sodium silicate crystal, pentahydrate ($Na_2Si_3.5H_2O$). However, other materials used to glue flux to welding stick rods can also be used but are expected to be efficatious than the sodium silicate crystal, pentahydrate. The second part of the second binder is a wetting agent that is used to convert the powder mixture into a solution with a metallic matrix and titanium diboride powders in suspension. Water has been found to be adequate for purposes of the present invention. However, other wetting agents can be used.

The elements making up the coating are originally mixed as powders, and a varying percentage of each component can be used. It is noted that the greater the percentage of hard, anti-abrasive material (such as $TiB_2$), the more wear-resistant will be the final liner. However, welding of the coating material is more difficult when there is more of the hard, anti-abrasive material. In contrast, with a smaller percentage of the hard, anti-abrasive material, the welding operation is much easier but the final lining is less wear-resistant. A typical composition by percentage of weight is as follows: nickel-chromium matrix powder 40,45%; titanium diboride anti-abrasive powder, 45%; and, a water solution of sodium silicate, 10%. However, other percentages can be used successfully within the concept of the present invention.

When the water solution of sodium silicate pentahydrate ($Na_2Si_3.5H_2O$) is mixed with the powders of the nickel-chromium matrix and the titanium diboride, a slurry is formed. Usually the mixture of sodium silicate crystal pentahydrate ($Na_2Si_3.5H_2O$) is mixed with the water in a ratio to one to twenty by weight. The amount of liquid binder (the sodium silicate crystal, pentahydrate and water) added to the mixture of matrix and anti-abrasive material powders determines how wet the coating is during the application to the substrate 1. In some arrangements, one part liquid binder to four parts of the matrix and anti-abrasion powders as provided the desired results. However, other mixture percentages can be used to carry out the goals and objects of the present invention.

In the simplest embodiment, the aforementioned slurry is pumped, poured (or added in any appropriate manner) into barrel 1 and manipulated (in any manner that can successfully move the slurry within tube 1) preferably to a thickness of approximately 0.040 inches in thickness. This thickness of slurry in the previously described percentage of the component materials will remain in position on the interior of the tube without running down vertical surfaces of the tube. It should be understood that different percentages of the slurry components can be used to obtain different coating thicknesses as is appropriate for different sizes and shapes of interior surfaces to be coated. For example, large flat surfaces may require different percentages of the components constituting the slurry and different thicknesses. Other interior surface shapes may require different thicknesses and slurry compositions. While the aforementioned components have been mentioned as optimum for slurry used on steel plasticating barrels, equivalent materials can also be used, and may prove to be more effective with other interior shapes constituted by other types of materials. A key factor in achieving a smooth coating of the aforementioned slurry on the interior of a metal barrel is constituted by the process of spinning the barrel and baking the slurry onto the interior surface of the barrel in a manner similar to conventional centrifugal baking processes. The difference in the present invention is that the paste or slurry is being baked onto the interior of the steel tube in order to adhere firmly and evenly to the interior of the tube. In this manner subsequent welding operation can be carried out much more efficiently, and with better results than can be obtained by feeding materials to the weld site using either the housing containing auxiliary systems, or the housing containing the laser aiming optics 4 (in FIG. 1).

The centrifugal baking process used in the present invention requires that the air, the barrel 1 and the coating be heated to a temperature of approximately 600° F. The waters evaporate from the coating, leaving the remaining mixture hard and firmly attached to the barrel substrate 1. While a temperature of 600° F. has proven effective for steel plasticating barrels, other coating materials will bond better at other temperatures. The baking temperature can be between 200° and 400° F. This temperature will not degrade the metal of plasticating barrel 1, but merely bakes the slurry onto the interior of the tube. As previously indicated, different materials to be coated may require different baking temperatures and times to carry out the baking of the slurry without degrading the substrate material on which the slurry is baked.

There are many advantages to preparing a tube or any interior surface for welding in the aforementioned manner. Most important is the elimination of the need to deliver welding material to the weld sight during the welding operation. Since the welding material is often delivered via a welding wire, welding stick or by injection of a powder, such conventional techniques can be problematical, especially with tubes having small internal diameters. In many cases a welding stick will simply not fit into the tube. Further, delivering a wire is problematical when the wire travels for more than a few feet. Also, when the wire contains hard materials, the wires are stiff and proned to kink or break during the feeding process.

The aforementioned embodiment of centrifugal casting a slurry on the interior of a tube (or making a slurry onto the interior surface of any other structure to be lined) greatly facilitates the use of other embodiments of the present invention, which require a structure (such as a metal tube) to be arranged in a horizontal position for the welding operation. It should be noted that the baking in the centrifugal casting process is affects only to the slurry, and greatly facilitates a clean, welding process. This is due to the fact that the baking drives out all the water from the slurry so that there will not be water present to vaporize during the welding operation, creating additional problems.

The aforementioned centrifugal baking operation further facilitates the advantageous use of a nickel-chromium matrix. This is particularly advantageous in that the nickel-chromium matrix is highly anti-corrosive. As a result, the liner 51 (FIG. 5) that is achieved is much more resistant to the corrosive materials generally handled by plasticating barrels. Further, the use of nickel-chromium matrix in the laser-welding operation can be used in other types of structures that are especially susceptible to corrosive materials.

The benefits in placing a tube to be lined in a horizontal position have already been made apparent. This positioning is facilitated by the arrangement depicted in FIG. 6. Support rod 60 is arranged through the center of metal tube 1. The support rod serves as a mounting along which welding head 7 is moved during the welding operation. The tube is supported by supports 21, which can be the same as those depicted in FIGS. 2(a) and 4(a). The support rod 60 is supported by support members 62 and supports 63, arranged near feeder mechanism 64. These feeding mechanisms operate to help move laser head 7 through the tube in order to carry out the welding operation described previously.

The laser head 7 can be motivated along a stationary support rod 60 or can be fixed thereto while the rod is moved to and fro through tube 1. Either arrangement falls within the basic concepts of this embodiment of the present invention. The use of support rods is particularly relevant to the embodiment of FIG. 2(b), which uses the adjustable conical mirror 23. This conical mirror, as previously described, receives a donut-shaped laser beam pattern, which would be irradiated around support rod 60 but would have no contact therewith. Of course, the support rod would not be useful in the embodiment of FIG. 4(a), which uses a rotating head. The operation of the rotating head would be hindered by a support rod 60 passing there through. Further, the rod would align with the laser beam (which in this embodiment is not a donut-shape) thereby necessitating the elimination of the support rod and the use of support sled 22.

While each of the preferred embodiments of the present invention has been directed to the lining of a steel (or steel alloy) plasticating barrel, other metal tubes can be lined using the various embodiments or any combination thereof of the previously-described invention. Also, other materials can be lined using the techniques of the present invention in any number of variations of the preferred embodiments described herein. For example, any type of metallic tube can be used, as well as plastic or "Kevlar®" in the inventive cladding process. Further, the lining material need not be a nickel chromium blend. Rather, other materials can be used as is appropriate with the substrate.

Further, while the present invention is particularly effective for an improved technique for lining the metal tubes, other, non-cylindrical, interior surfaces can be lined by the techniques of the present invention. A variety of different shapes are applicable to the lining operation of the present invention. For example, a double-barrel arrangement can easily be addressed by running the laser head 7 through one barrel and then the second. The flat surfaces (not shown) connecting the curved surfaces of the two barrels can be clad with either or both of the welding operations that clad each of the two barrels. The welding operation can be adjusted by programming the controller which controls the movement of the welding head, the power of the laser and the focusing of the welding beam. Such adjustments are within the capability of those skilled in this technology, and can be adapted to the operation of the present invention.

While a number of embodiments and variations have been made by way of example, the present invention is not to be limited thereby. Rather, the present invention should be construed to include any and all modifications, permutations, variations, adaptations and embodiments that would occur to one skilled in this technology once taught the present invention by this application. Accordingly, the present invention should be considered as being limited only by the following claims.

We claim:

1. A method of lining a metal tube by laser welding, said process comprising the steps of:
   a) arranging said metal tube in a horizontal position;
   b) placing a laser aiming optics head in said metal tube; and,
   c) carrying out a plurality of laser-welds in a single direction while rotating said metal tube and moving said laser weld head in a single direction along said metal tube.

2. The process of claim 1, wherein said laser-welding is carried out in a spiral pattern.

3. The process of claim 1, wherein said metal tube is rotated and said laser aiming optics head is moved along the longitudinal axis of said metal tube to a predetermined position to effect spot welding.

4. The process of claim 1, wherein said metal tube comprises steel and said lining comprises an anti-corrosive and anti-abrasive nickel-chrome matrix.

5. The process of claim 4, further comprising the step of adding an anti-abrasive material to each of said plurality of laser-welds.

6. The method of claim 5, wherein said anti-abrasive material consists of titanium diboride ($TiB_2$).

7. The method of claim 5 wherein said metal tube is steel.

8. A method of lining a metal multidiretional tube by laser-welding, said method comprising the steps:
   a) placing a laser aiming optics head in said metal tube at a first end of said metal tube;
   b) transmitting laser light from a second end of said metal tube to be deflected by said laser aiming optics head to effect laser-welding in said metal tube; and
   c) moving said laser aiming optics head along an axis of said metal tube while repeating the step of laser-welding;
      wherein said metal tube is rotated while moving said laser aiming optics head along the longitudinal axis of said metal tube to effect laser-welding over an entire interior of said metal tube; and
      wherein said laser-weld head is rotated and moved along the longitudinal axis of said metal tube to effect laser-welding of an entire inside diameter of said metal tube.

9. A method of cladding an interior surface by laser-welding, said method comprising the steps of:
   a) arranging a laser aiming optics head to operate in a predetermined pattern along said interior surface to create a series of weld melts, each said weld melt having a warmer leading portion and a cooler wailing portion; and,
   b) adding an anti-abrasive material to said traling portion of each said weld melt whereby said anti-abrasive material is undegraded and uniformly distributed throughout each said weld melt;
   wherein said interior surface is within a metal tube; and,
   wherein each said weld melt is formed of a nickel-chrome mixture.

10. The method of claim 9, wherein said anti-abrasive material titanium diboride ($TiB_2$).

11. The method of claim 10, wherein said metal tube is rotated.

12. The method of claim 10, wherein said laser aiming optics head is rotated.

13. A method of lining a tube comprising the steps of:
   (a) inserting a slurry comprising $TiB_2$ into said metal tube, said slurry including liner material;
   (b) centrifugally casting said slurry within said metal tube to form a uniform hard coating over an inside diameter of said metal tube; and, (c) laser-welding said hard coating to form said liner.

14. The method of claim 13, wherein said slurry consists of:
   (a) a nickel-chromium mixture;
   (b) a $Na_2Si_3.5H_2O$ binder, mixed with water; and,
   (c) a $TiB_2$ anti-abrasive material.

15. The method of claim 14, wherein said step of centrifugal baking is carried out at a temperature between 200° and 600° F.

16. The method of claim 15, wherein said coating is formed to a thickness of substantially 0.040 inches by said centrifugal baking process.

* * * * *